United States Patent
Wernet et al.

(10) Patent No.: US 7,134,330 B2
(45) Date of Patent: Nov. 14, 2006

(54) CAPACITIVE FILL LEVEL METER

(75) Inventors: Armin Wernet, Rheinfelden (DE);
Clemens Heilig, Offenburg (DE)

(73) Assignee: Endress + Hauser GmbH + Co. KG,
Maulburg (DE)

( * ) Notice: Subject to any disclaimer, the term of this patent is extended or adjusted under 35 U.S.C. 154(b) by 0 days.

(21) Appl. No.: 10/840,333

(22) Filed: May 7, 2004

(65) Prior Publication Data

US 2005/0039528 A1     Feb. 24, 2005

Related U.S. Application Data

(60) Provisional application No. 60/473,882, filed on May 29, 2003, provisional application No. 60/472,778, filed on May 23, 2003.

(30) Foreign Application Priority Data

May 16, 2003     (DE) ................................ 103 22 279

(51) Int. Cl.
*G01F 23/00* (2006.01)
(52) U.S. Cl. .................... 73/290 R; 73/304 C
(58) Field of Classification Search ............. 73/304 C, 73/290 R, 290 V, 304
See application file for complete search history.

(56) References Cited

U.S. PATENT DOCUMENTS 4,173,893 A  * 11/1979 Hedrick .................... 73/304 C
4,412,450 A  * 11/1983 Franz et al. ............... 73/304 C
4,914,377 A  *  4/1990 Russell ........................ 324/690
5,602,333 A      2/1997 Larrabee et al. .............. 73/149

FOREIGN PATENT DOCUMENTS

| DE | 36 43 389 A1 | 7/1988 |
| DE | 197 57 190 A1 | 6/1999 |
| DE | 100 08 093 A1 | 9/2001 |
| EP | 0 271 849 B1 | 6/1988 |
| EP | 0 338 400 B1 | 10/1989 |
| WO | WO 03/050480 A1 | 6/2003 |

* cited by examiner

*Primary Examiner*—Hezron Williams
*Assistant Examiner*—Rodney Frank
(74) *Attorney, Agent, or Firm*—Bacon & Thomas

(57) ABSTRACT

An apparatus for capacitive determination and/or monitoring of the fill level of a medium in a container, having at least one fill level probe, and having at least one electronic field device which communicates with the fill level probe. The at least one electronic fill device generates a voltage trigger signal ($sig_1$) for triggering the fill level probe, and receives and evaluates a measurement current ($I_2$) of the fill level probe. At least one microprocessor is provided in the electronic field device, which microprocessor generates the voltage trigger signal ($sig_1$), and/or which microprocessor evaluates at least the measurement current ($I_2$) and/or a measured variable proportional to it.

9 Claims, 2 Drawing Sheets

CAPACITIVE FILL LEVEL METER

This application claims the benefit of provisional application No. 60/472,778 filed May 23, 2003.

FIELD OF THE INVENTION

The invention relates to an apparatus for capacitive determination and/or monitoring of the fill level of a medium in a container, having at least one fill level probe, and having at least one electronic field device, which communicates with the fill level probe, which generates a voltage trigger signal ($sig_1$) for triggering the fill level probe, and which receives and evaluates a measurement current ($I_2$) of the fill level probe.

BACKGROUND OF THE INVENTION

Capacitive measuring instruments for measuring fill levels have been known for many years. A probe protruding into the container and the container wall, or two sensors protruding into the container, form a capacitor. This capacitance $C_1$ is dependent on the fill level and on the dielectric constant of the medium to be measured. Thus from the capacitance, a conclusion can be drawn as to the fill level.

One possible way of measuring this capacitance $C_1$ is known as apparent current measurement. For instance, the amount of the alternating current flowing through the capacitor, made up of the sensor, the medium, and the container wall, at a certain frequency and voltage and at the capacitance $C_1$ to be determined is measured by means of a conventional rectifier circuit. The apparent current $I_s$, however, is dependent not only on the capacitance $C_1$ but also on the conductivity $R_1$ of the medium to be measured. Since especially with bulk goods, the conductivity $R_2$ depends on various factors, such as temperature or humidity, the results obtained are imprecise.

One method for suppressing the influence of this parallel conductivity is measurement at relatively high frequencies. The proportion of the apparent current $I_s$ flowing through the capacitance $C_1$ is proportional to the frequency, while conversely the proportion caused by the conductivity $R_1$ remains constant. Thus at high frequencies, the capacitive proportion practically always predominates. However, experience teaches that with long probes with high parasitic inductances, measurement at high frequencies (>100 kHz) is difficult.

Another method of measuring the capacitance $C_1$ is to measure not the apparent current $I_s$ but rather the blind current at a phase displacement angle of 90° between the current and the voltage, which is equivalent to measuring purely capacitance. This can be done for instance with the aid of a synchronous rectifier circuit (see German Patent DE 42 44 739 C2). For some media, this method has disadvantages. In media with a low dielectric constant and high conductivity, which can be measured well using apparent current measurement, difficulties arise because of the practically vanishing blind current. Moreover, such conventional synchronous rectifier circuits are known from experience to be vulnerable to electromagnetic interference.

Problems in measurement occur for instance from tolerances in the components used and from encrustation that can occur on the measurement probe from the medium to be measured. This encrustation sometimes severely affects the measurement signal and thus also the measured value.

SUMMARY OF THE INVENTION

The object of the invention is accordingly to measure the fill level capacitively as precisely as possible.

This object is attained in accordance with the invention in that at least one microprocessor is provided in the electronic field device, which microprocessor generates the voltage trigger signal ($sig_1$), and/or which microprocessor evaluates at least the measurement current ($I_2$) and/or a measured variable proportional to it. A measured variable proportional to the measurement current ($I_2$) is for instance a voltage proportional to this current $I_2$ that can be obtained for instance by means of an ohmic resistor.

Thus the fundamental concept is that a microprocessor generates the voltage trigger signal ($sig_1$) and thus also predetermines the measuring frequency, and/or that the measurement signal—the measurement current ($I_2$)—is evaluated by the microprocessor. The microprocessor can also independently set the measuring and excitation method, for instance by selecting the optimal method on the basis of the results from various sample measurements, and optionally also sets whatever is the optimal measurement method during operation, for instance under varying conditions in the field. This may be of value for instance for a medium whose dielectric constant or conductivity value varies over time. Thus the microprocessor performs a measurement of apparent current and/or blind current and/or effective current, depending on requirements. This is possible, among other reasons, because the phase angle at which the current is evaluated by the probe can be selected arbitrarily by software within wide limits. A conductivity measurement is thus also possible. These different measuring methods can thus also be combined with one another, allowing even more possibilities in terms of evaluation as well as recovery of information. The microprocessor furthermore takes on such additional functions as linearizing and scaling the signals. Because of the use of the microprocessor, it is furthermore possible to generate different output signals that depend on the further use of the output signal, or on the transmission protocol employed. For instance, a 4 to 20 mA signal, a 0 to 10V signal, a PFM signal (pulse frequency modulation signal), or a binary switching signal can be generated. However, it is also conceivable for a plurality of output signals (4 to 20 mA, 0 to 10V, PFM signal, binary switching signal, etc.) to be generated and output for various transmission protocols or intended uses. If between the individual measurement cycles, intervals are incorporated during which the microprocessor is switched to an energy saving mode and no current flows through the probe, then the current consumption can also be reduced to a fraction of the usual value for capacitive sensors. This is advantageous especially for NAMUR applications. Thus the microprocessor provides a certain flexibility in terms of the measurement method as well as in terms of further processing. Since a majority of the functions that in previous technology were achieved using analog circuits are now shifted into the microprocessor or its software, it is substantially simpler to produce individual platform-based variants economically.

One feature provides that the measurement frequency and/or the shape of the voltage trigger signal ($sig_1$) is adjustable by the microprocessor. Thus for instance a higher frequency can be set if a blind current measurement is less appropriate because of the given conditions and an apparent current measurement at high frequencies is more effective. With the microprocessor, it is easy to generate nearly every frequency below the clock frequency. The advantage is accordingly that by means of the microprocessor, the frequency is set optimally for the measurement conditions.

One feature provides that the voltage trigger signal ($sig_1$) is a bit pattern. Typically, this bit pattern is output with a resolution of 2 or 3 bits.

One feature provides that at least one digital/analog converter is provided, which converts a digital voltage trigger signal ($sig_1$) into an analog voltage trigger signal ($sig_1{}^a$). The microprocessor generates a digital signal, which for further processing must be in analog form. This conversion can be accomplished by means of a simple resistor network, for instance.

One feature provides that at least one filter is provided, which converts the analog voltage trigger signal ($sig_1{}^a$) into a sine-wave trigger voltage ($U_1$). The filter is for instance a low-pass or a bandpass filter. However, it is also possible to use arbitrary other signal shapes with a defined harmonic content for the measurement. For this reason, a sine-wave signal should be considered as merely an example. Other ways of attaining the object will occur to one professionally qualified in this field. With the filter, it also proves to be an advantage if the voltage trigger signal ($sig_1$) is a bit pattern. If the limit frequency of the filter and the graduation of the resistor network is skillfully selected, it is possible, without switching the limit frequency of the filter over, to generate sine-wave signals of arbitrary measurement frequency from virtually every voltage trigger signal ($sig_1$), since it is only the individual graduations that ever need to be smoothed. A frequency switchover is therefore easily attained by software in the microprocessor, and a switchover in the analog filter is unnecessary.

One feature provides that at least one current/voltage converter is provided, which converts the measurement current ($I_2$) into a voltage signal ($U_2$) that is proportional to the measurement current ($I_2$). Such a voltage signal, in contrast to a current signal, is then for instance accessible to digital scanning. In the simplest feature, the current/voltage converter is an ohmic resistor.

One feature provides that at least one analog/digital converter is provided, which digitizes the voltage signal ($U_2$) that is proportional to the measurement current ($I_2$). In the digital form, the microprocessor can evaluate the measurement current ($I_2$) or the voltage signal ($U_2$) proportional to it.

One advantageous feature provides that the microprocessor in the electronic field device scans the measurement current ($I_2$) and/or the voltage signal ($U_2$) that is proportional to the measurement current ($I_2$) directly. Thus no synchronous rectifier or other evaluation is needed. The microprocessor scans the measured signal and/or a signal proportional to it—in this case the voltage—directly. This reduces expense and also for instance prevents errors or inaccuracies from being caused by the interposed electronics. In particular, no external radiation that could otherwise interfere with the measurement is rectified by a conventional rectifier circuit. This makes this evaluation method fundamentally much less vulnerable to interference-signal radiation and injection.

One advantageous feature provides that at least one analog/digital converter is provided, which converts the sine-wave trigger voltage ($U_1$) into a digitized sine-wave trigger voltage ($U_1{}^d$). This is important for the evaluation in the microprocessor. In this way, the signal that the measurement probe is subjected to is also delivered to the microprocessor. By means of the analog electronic part, variations in the trigger signal can occur that because of this feedback are taken into account in the evaluation of the measurement signal. Because the trigger signal is included in the evaluation, it is also possible for instance to detect, report, or computationally filter out interference, errors, and so forth. A comparison between the voltage trigger signal ($sig_1$) and the sine-wave trigger voltage ($U_1$) is also possible. If the trigger signal and the measurement signal are both processed by analog/digital converters which refer to the same reference voltage (such as the supply voltage of the processor), then it is unnecessary to regulate the excitation voltage/operating voltage, which makes for less effort and expense in the analog circuit.

An advantageous feature provides that the microprocessor in the electronic field device scans the sine-wave trigger voltage ($U_1$) directly. Thus both signals are scanned directly, and it is also possible directly, for instance by way of the phase difference between the two signals, to determine the corresponding measured variables (blind current, apparent current, and effective current). This feature and the previous feature with the evaluation of the exciting signal thus also furnish a reference value for evaluating the measurement signal. The concept presented in this feature and the feature discussed prior to it above is fundamentally invulnerable to temperature factors and to component tolerances in the measuring device, since the measurement outcome is obtained by forming the ratio of the voltages $U_1$ and $U_2$, and phase and amplitude deviations affect both $U_1$ and $U_2$ equally. Thus by means of the evaluation of the exciting signal, a reference measurement is constantly made. This simplifies the evaluation.

An advantageous feature provides that in evaluating the measurement current ($I_2$) and/or a measured variable proportional to it, the microprocessor in the electronic field device uses the sine-wave trigger voltage ($U_1$), for referencing. Thus the phase, for instance, can be evaluated more precisely, so that more measured variables (blind current, apparent current and effective current) can be obtained from one measurement, which in turn furnishes more information—such as encrustation detection.

One advantageous feature provides that the microprocessor in the electronic field device is embodied such that an encrustation detection is performed. By the evaluation of the phase between the trigger signal and the voltage signal that is proportional to the measurement current and evaluating the apparent current, it can for instance be learned whether an encrustation has formed on the measurement probe, or if the encrustation is for instance increasing. This is made possible by the digital scanning of the total measurement signal, or by referencing using the trigger signal as well. If over time the effective current $I_w$, for instance, varies, then conclusions can be drawn about an encrustation.

Thus in the invention, the trigger signal and the measurement signal, or the voltage proportional to it, are scanned directly. Because of this complete scanning of both signal courses, it is possible with a single measurement to determine both the phase and the apparent current, for instance. This in turn not only allows determining the capacitance and the fill level but also makes it possible to detect encrustation on the measurement sensor, so that special alarms for the sake of predictive maintenance can be issued, for instance to draw attention to the encrustation and thus make it possible to react to it soon enough.

The invention is described in described in further detail in conjunction with the following drawings.

DESCRIPTION OF THE PREFERRED EMBODIMENTS

Figure 1:
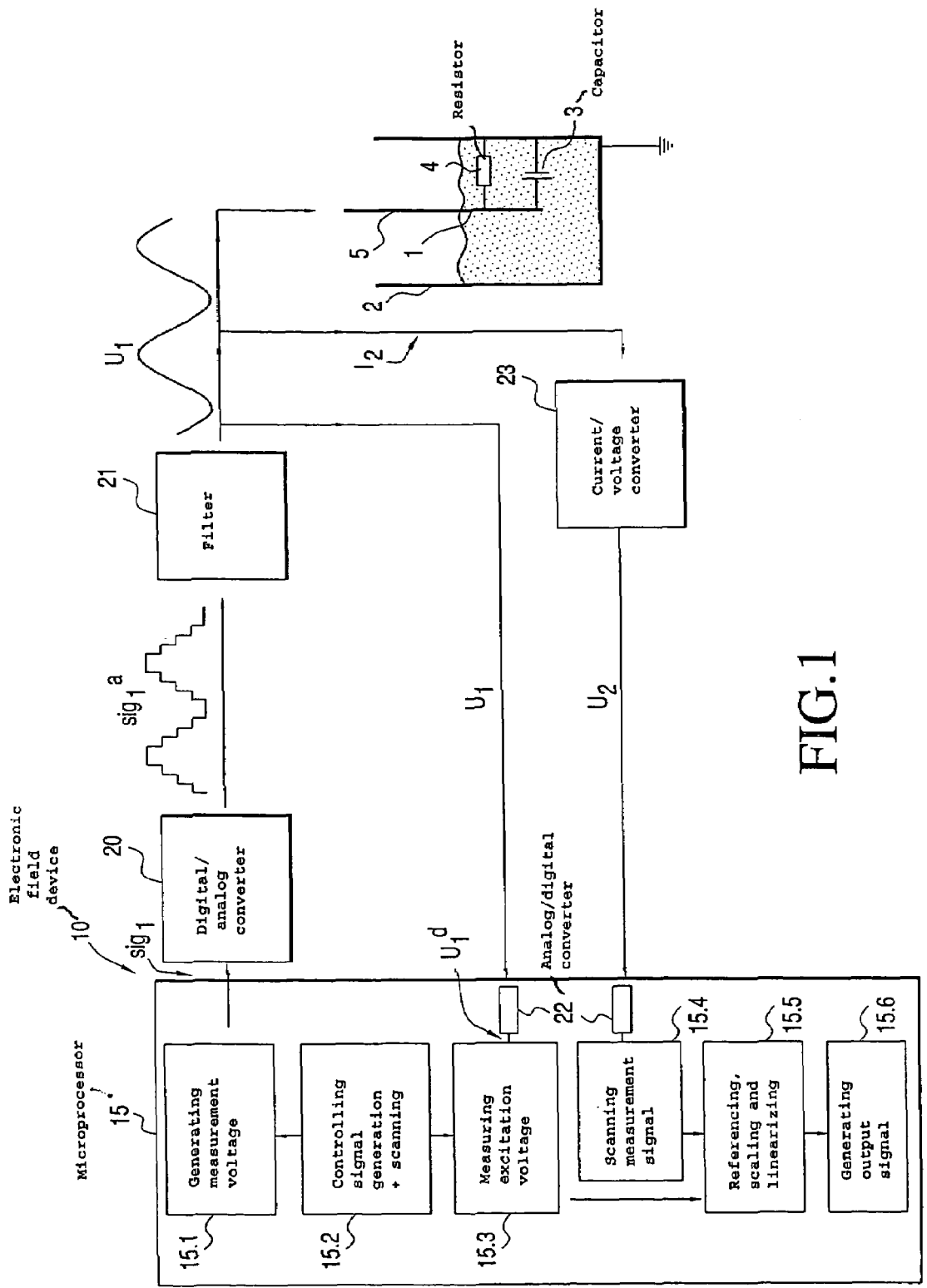
FIG. 1: a block circuit diagram of the apparatus.

FIG. 1 is a block circuit diagram for one possible embodiment. The central element of the circuit is a microprocessor 15, which inside the electronic field device 10, by means of various exemplary function blocks 15.1–15.6, takes on the following functions:

The unit 15.1 for outputting the measurement signal outputs a bit pattern for generating a square-wave or stairstep signal at the measurement frequency suitably set by the microprocessor. Typically, this bit pattern is output with a resolution of 2 or 3 bits and can be converted (simplest digital/analog conversion) via a simple resistor network 20 into an analog stairstep voltage $sig_1{}^a$. This stairstep voltage $sig_1{}^a$ is converted by ensuing filtering 21—for instance by a low-pass or a bandpass filter—into a sine-wave measurement voltage $U_1$. In the unit 15.2, the signal generation (selection of the measurement frequency) and the desired instant of scanning of the analog/digital converter 22 are controlled. In a further function block 15.3, the excitation voltage $U_1$ downstream of the analog/digital converter 22 is measured. The same is done for the measurement signal voltage $U_2$ downstream of the analog/digital converter 22 of the measurement voltage $U_2$, which is directly proportional to the current $I_2$ flowing through the probe and which is generated by means of the current/voltage converter 23. Next, ratio formation, scaling and linearizing of the measured voltages $U_1$ and $U_2$ in function block 15.5, that is, the actual evaluation. The phase angle difference at which the measurement signal is evaluated can be set simply and practically using the microprocessor. However, the microprocessor also permits complete scanning of the measurement signal, so that instead of using only a single value of the measurement signal for evaluation, the entire course of the measurement signal is evaluated. As a result, the phase relationship between the measurement voltage $U_1$ and the measurement signal voltage $U_2$ and the blind current can be determined. This makes it possible to determine the capacitance and for instance to decide whether there is an encrustation on the measurement sensor 5, for instance. Increasing the number of data points of the measurement also increases the information obtained. In the evaluation, a connection with function block 15.2 can also be provided, so that from the results obtained, for instance also in conjunction with predetermined limit values among other factors, the optimal measurement and evaluation method will be performed. In addition, a suitable output signal is generated, which can optionally also travel via a digital/analog converter. From the values obtained, the desired output signal is then generated by function block 15.6 and is output, for instance via a digital/analog converter or a digital port. In the exemplary embodiment, a microprocessor is shown that has a plurality of function blocks. Naturally, there may also be a plurality of interconnected microprocessors that perform the various tasks. The container 2 is also shown, along with the medium 1 into which the measuring sensor 5 plunges. Also shown is the capacitor 3 that results from the sensor 5 and the wall of the container 2. Moreover, the sensor 5, medium 1 and the wall of the container 2 also form a resistor 4, by way of which a current likewise flows.

Figure 2A:
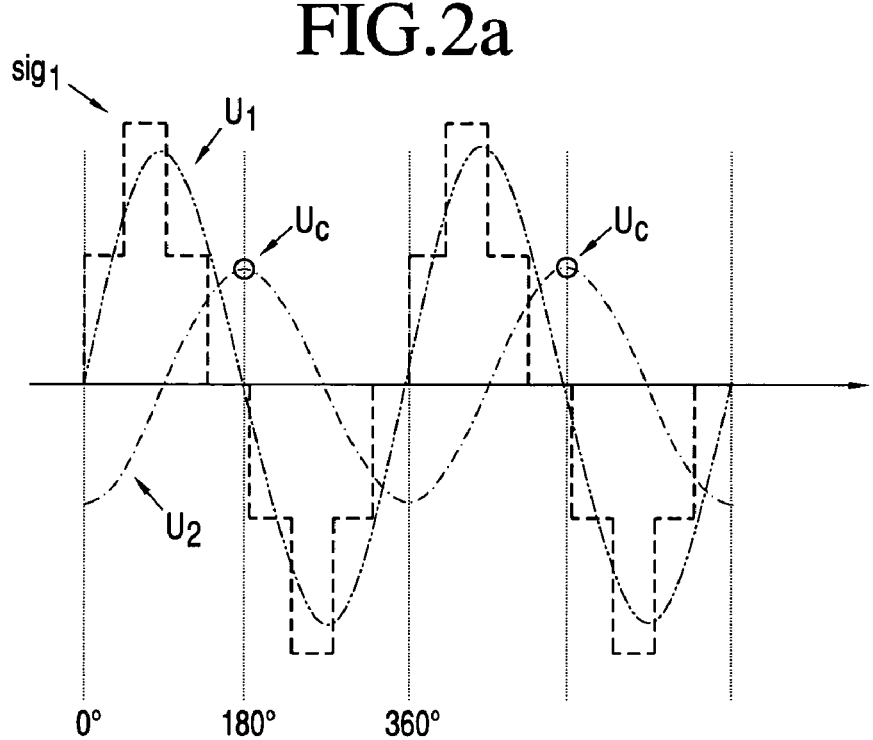
FIGS. 2a and 2b: two courses over time of the incident signals, under two different sets of field conditions.
Figure 2B:
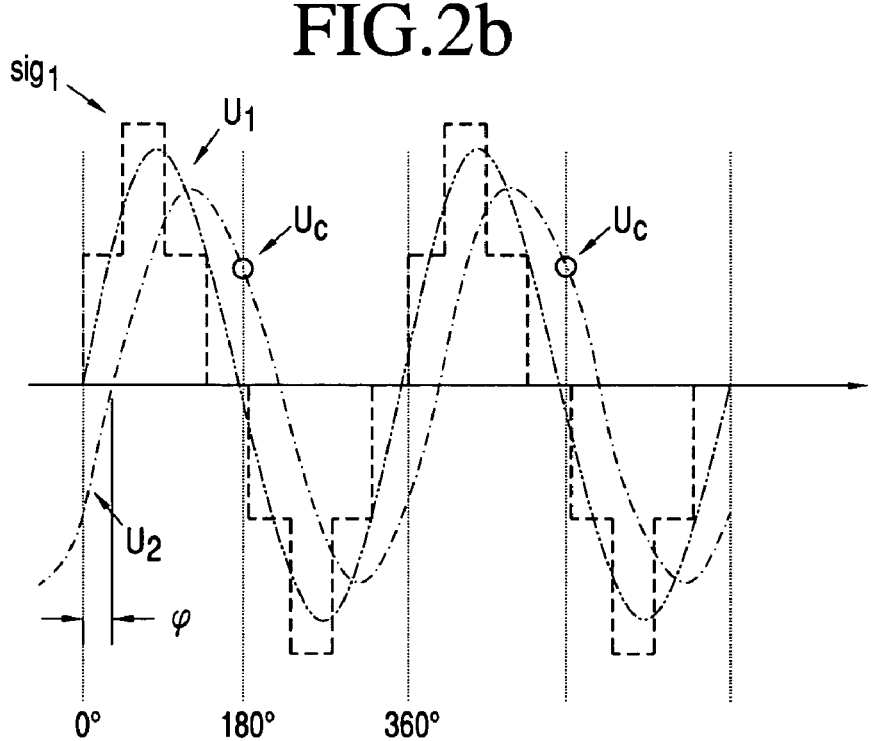

In FIGS. 2a and 2b, the signals $sig_1$, $U_1$ and $U_2$ are shown as a function of time. The excitation voltage $U_1$, with a certain phase delay caused by the filtering, follows the signal $sig_1$ generated by the microprocessor. The phase delay can be included in the evaluation by using the excitation voltage $U_1$, scanned in the microprocessor 15, for referencing. If a purely capacitive behavior of the probe/medium/container arrangement at the capacitance $C_1$ (FIG. 2a) is assumed, then the voltage $U_2$, which is proportional to the current flowing through the probe, is then phase-displaced by 90° from the voltage $U_1$. If the voltage $U_2$ is measured at a phase displacement of exactly 180° from the excitation voltage $U_1$, then when the probe has a purely capacitive load, the maximum amplitude of $U_2$ (indicated at $U_c$) will always be obtained.

If in addition to the capacitance $C_1$, a parallel resistance $R_1$ of the medium is assumed (FIG. 2b; compare FIG. 1), the amount of the current through the probe and thus the voltage $U_2$ increase. At the same time, the phase angle between $U_1$ and $U_2$ becomes less than 90°. However, if the voltage $U_2$, in this case as well, is measured at a phase angle of 180° relative to the excitation voltage $U_1$, then the amplitude of $U_c$ does not change compared to the case shown in FIG. 2a. It is possible in this way to measure the capacitance $C_1$ independently of the parallel resistance $R_1$. Since many problems in capacitive measurements are caused by conductive encrustation and fluctuations in humidity, which change the conductivity of the medium to be measured, this has pronounced advantages for the user. Conversely, this encrustation can be detected by evaluating the apparent current $I_s$. Evaluating the blind current and apparent current is made possible by means of scanning the entire measurement signal. In FIG. 2b, the phase or phase angle $\phi$ between $U_1$ and $U_2$ is shown. By way of this phase, the effective component $U_W$ of the measurement voltage $U_2$ can be calculated as follows: $U_W = U_2 * \cos(\phi)$. With this value, it is possible to detect encrustation, since an increase in the encrustation is typically associated with an increase in the effective component. The blind proportion $U_B$ of the measurement voltage $U_2$ is calculated by way of the equation $U_B = U_2 * \sin(\phi)$. This value makes it possible to determine the capacitance and thus the fill level of the medium.

The invention claimed is:

1. An apparatus for capacitive determination and/or monitoring of the fill level of a medium in a container, comprising:
   at least one fill level probe;
   at least one electronic field device, which communicates with said at least one fill level probe, and generates a voltage trigger signal ($sig_1$) which is converted into a sine-wave trigger voltage ($U_1$) for triggering said at least one fill level probe, and which receives and evaluates a measurement current ($I_2$) of said at least one fill level probe; and
   at least one microprocessor in said at least one electronic field device, said at least one microprocessor generates the voltage trigger signal ($sig_1$) samples a voltage signal ($U_2$) that is proportional to the measurement current ($I_2$) directly, evaluates the sampled course over time of the voltage signal ($U_2$) that is proportional to the measurement current ($I_2$), samples the sine-wave trigger voltage ($U_1$) directly, and uses the sine-wave trigger voltage ($U_1$) for referencing in evaluating the measurement current ($I_2$).

2. The apparatus of claim 1, wherein:
the measurement frequency and/or the shape of the voltage trigger signal ($sig_1$) is adjustable by said microprocessor.

3. The apparatus of claim 1, wherein:
the voltage trigger signal ($sig_1$) is a bit pattern.

4. The apparatus of claim 1, further comprising:
at least one digital/analog converter, which converts a digital voltage trigger signal ($sig_1$) into an analog voltage trigger signal ($sig_1^a$).

5. The apparatus of claim 4, further comprising:
at least one filter, which converts the analog voltage trigger signal ($sig_1^a$) into a sine-wave trigger voltage ($U_1$).

6. The apparatus of claim 1, further comprising:
at least one current/voltage converter, which converts the measurement current ($I_2$) into a voltage signal ($U_2$) that is proportional to the measurement current ($I_2$).

7. The apparatus of claim 1, further comprising:
at least one analog/digital converter (22), which digitizes the voltage signal ($U_2$) that is proportional to the measurement current ($I_2$).

8. The apparatus of claim 5, further comprising:
at least one analog/digital converter, which converts the sine-wave trigger voltage ($U_1$) into a digitized sine-wave trigger voltage ($U_1^d$).

9. An apparatus for capacitive determination and/or monitoring of the fill level of a medium in a container comprising:
at least one fill level probe;
at least one electronic field device, which communicates with said at least one fill level probe, and generates a voltage trigger signal ($sig_1$) for triggering said at least one fill level probe, and which receives and evaluates a measurement current ($I_2$) of said at least one fill level probe; and
at least one microprocessor in said at least one electronic field device, said at least one microprocessor generates the voltage trigger signal ($sig_1$), and a measured variable proportional to the measurement current ($I_2$) wherein:
said at least one microprocessor is embodied such that an encrustation detection is performed by evaluation of the phase between the trigger signal and the voltage signal that is proportional to the measurement current and the apparatus current.

* * * * *